United States Patent
Zhou et al.

(10) Patent No.: US 11,354,919 B2
(45) Date of Patent: *Jun. 7, 2022

(54) TECHNIQUES FOR DOCUMENT CREATION BASED ON IMAGE SECTIONS

(71) Applicants: ATLASSIAN PTY LTD, Sydney (AU); ATLASSIAN, INC., San Francisco, CA (US)

(72) Inventors: Yuntao Zhou, San Francisco, CA (US); Andrew Nelson, San Francisco, CA (US); Bradley Rodgers, San Francisco, CA (US)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/841,432

(22) Filed: Apr. 6, 2020

(65) Prior Publication Data
US 2020/0234038 A1  Jul. 23, 2020

Related U.S. Application Data

(63) Continuation of application No. 16/364,592, filed on Mar. 26, 2019, now Pat. No. 10,643,065.
(Continued)

(51) Int. Cl.
*G06F 40/00* (2020.01)
*G06V 30/412* (2022.01)
(Continued)

(52) U.S. Cl.
CPC .......... *G06V 30/412* (2022.01); *G06F 40/103* (2020.01); *G06F 40/166* (2020.01); *G06V 30/416* (2022.01)

(58) Field of Classification Search
None
See application file for complete search history.

(56) References Cited

U.S. PATENT DOCUMENTS

| 7,006,098 B2 | 2/2006 | Bickmore |
| 7,539,343 B2 | 5/2009 | Simske |

(Continued)

OTHER PUBLICATIONS

Zhou, U.S. Appl. No. 16/364,592, filed Mar. 26, 2019, Notice of Allowance, dated Jan. 15, 2020.
(Continued)

*Primary Examiner* — Maikhanh Nguyen
(74) *Attorney, Agent, or Firm* — Brownstein Hyatt Farber Schreck, LLP

(57) ABSTRACT

In an embodiment, an image reception system is communicatively coupled to an image analysis system and is configured to receive a digital image and analyze the pixels of the digital image to determine one or more regions in the digital image. For each region in the one or more regions in the digital image, the image analysis system recognizes the content in the region. A document creation system communicatively coupled to the image analysis system is configured to create a digital document based on the recognized content for the one or more regions. In some embodiments, the image analysis system is further configured to analyze the digital image to detect one or more of the following: region markers, tables, headers.

18 Claims, 9 Drawing Sheets

Related U.S. Application Data

(60) Provisional application No. 62/687,892, filed on Jun. 21, 2018.

(51) Int. Cl.
    *G06F 40/103*     (2020.01)
    *G06F 40/166*     (2020.01)
    *G06V 30/416*     (2022.01)

(56) References Cited

U.S. PATENT DOCUMENTS

| | | |
|---|---|---|
| 7,774,431 B2 | 8/2010 | Conn |
| 7,845,560 B2 | 12/2010 | Emanuel |
| 8,146,005 B2 | 3/2012 | Jones |
| 8,270,030 B2 | 9/2012 | Ohkawa |
| 8,692,830 B2 | 4/2014 | Nelson |
| 8,873,744 B2 * | 10/2014 | Inami ................ G09C 5/00 380/28 |
| 8,988,456 B2 | 3/2015 | Hanson |
| 9,530,050 B1 | 12/2016 | Erol |
| 9,561,387 B2 | 2/2017 | Yan |
| 9,582,728 B2 * | 2/2017 | Kleinman ............ G06K 9/6202 |
| 2003/0206170 A1 | 11/2003 | Bickmore |
| 2004/0245339 A1 * | 12/2004 | Holenstein ......... G06K 17/0032 235/454 |
| 2007/0047813 A1 | 3/2007 | Simske |
| 2008/0275881 A1 | 11/2008 | Conn |
| 2009/0251484 A1 * | 10/2009 | Zhao ................. H04M 1/72427 345/591 |
| 2011/0019816 A1 * | 1/2011 | Inami ........................ H04L 9/08 380/28 |
| 2011/0229035 A1 | 9/2011 | Sohma |
| 2011/0234613 A1 | 9/2011 | Hanson |
| 2012/0259681 A1 * | 10/2012 | Poulos ................. G06Q 20/401 705/12 |
| 2015/0085072 A1 | 3/2015 | Yan |
| 2015/0135046 A1 * | 5/2015 | Moore ............... G06Q 10/1093 715/202 |
| 2015/0205978 A1 | 7/2015 | Elsen |
| 2015/0227786 A1 * | 8/2015 | Fujioka ................. G06F 3/0317 382/188 |
| 2016/0117570 A1 * | 4/2016 | Wolk ................. G06K 9/00671 382/195 |
| 2016/0171325 A1 * | 6/2016 | Kleinman ............ G06K 9/3216 382/154 |
| 2016/0180565 A1 * | 6/2016 | Moore .................. G06T 11/001 715/255 |

OTHER PUBLICATIONS

Zhiu, U.S. Appl. No. 16/364,592, filed Mar. 26, 2019, Office Aciton, dated Jun. 28, 2019.

* cited by examiner

TECHNIQUES FOR DOCUMENT CREATION BASED ON IMAGE SECTIONS

BENEFIT CLAIM

This application claims the benefit under 35 U.S.C. § 120 as a Continuation of U.S. application Ser. No. 16/364,592, filed Mar. 26, 2019, now U.S. Pat. No. 10,643,065, which claims the benefit under 35 U.S.C. § 119(e) of provisional application 62/687,892, filed Jun. 21, 2018, the entire contents of which is hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

TECHNICAL FIELD

One technical field of the present disclosure is computer programs that provide structured documents or web pages based on digital images. Another technical field is computer analysis of digital images captured by digital cameras or other means and comprising regions and/or markers indicating sections in the images.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In business, technology, education and other fields, collaboration with others by using white boards, large paper sheets, easel pads, and similar areas for writing. At key times or at the end of meetings, participants may take a digital picture of that work and may paste it into a shared document. There are many issues with this approach to sharing that collaborative work, however. The images typically are digitally stored in pixel form using formats such as JPEG or TIFF, and therefore do not provide the ability to format content in the digital image to match the rest of the content of a containing page or related pages, cannot be adjusted in any way and do not match the style and formatting of the page into which they are pasted. For example, correcting errors or changing font size and type, headers and other attributes may be difficult. Further, it may be beneficial for documents such as web pages into which the picture of a white board is pasted, that is used for collaboration with that team to have underlying metadata indicating sections of the documents, titles, headers, and the like. The digital image pasted onto the document does not have these types of metadata. As such, when that metadata is relied upon for example to use the title and headers to make a table or contents or index, that depicted in the digital image will not be relied upon. Another issue is that, because the text is in pixel and not in a character encoding, such as ASCII, one cannot easily search for text in these images using a text search. Therefore, the text in the image will be hard to discover using conventional means.

SUMMARY

The appended claims may serve as a summary of the invention.

DETAILED DESCRIPTION

Figure 1:
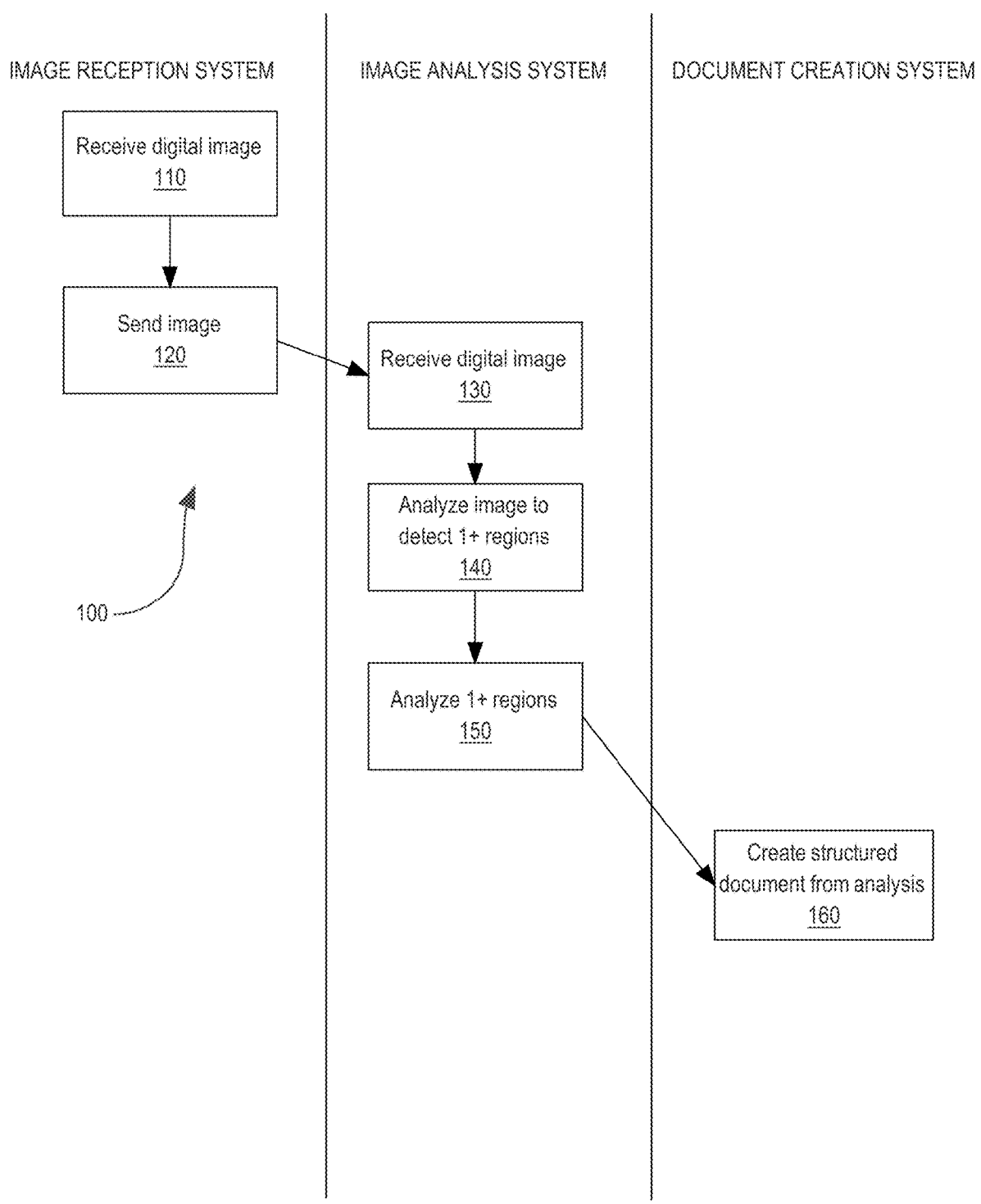
FIG. 1 illustrates an example process that may govern the operation of an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Process Overview
3.0 System Overview
4.0 Additional Examples
5.0 Implementation Mechanisms—Hardware Overview 1.0 General Overview In various embodiments of the techniques herein, after a group has collaborated to draw a collaboration image, for example, a to-do list, on a collaboration medium, for example, a whiteboard, a device, for example, a mobile phone, may be used to capture a digital picture of the collaboration medium including the collaboration image and/or other drawing or writing that group has made. That collaboration image could have multiple regions or sections corresponding to multiple different aspects of a project or meeting. Further, the collaboration image may have markers placed thereon in order to indicate parts of an indicated structural document corresponding to the content of the project or meeting. The markers may indicate what kind(s) of region(s) the picture has in it and how that should be mapped to a corresponding structured document. Further, the markers may indicate people or teams that should "own" portions of the document. As an example, a team could draw a to-do list on a whiteboard, and the to-do list may have a marker on it indicating that the region contains a to-do list. Further, each item in the to-do list may have an avatar or other marker placed on it in order to indicate who should be assigned the task in the to-do list or who should be sent a copy of the digital document when it is created.

The image taken of the collaboration image can be analyzed in order to detect one or more regions in the image. Each of those regions can then be further analyzed in order to determine any text, images, or markers in that region. Continuing the example above, in addition to the to-do list region, which may be indicated by a marker, the image may also have a flow diagram indicating a process, and that may be indicated with a marker that indicates that it is a flow diagram. The flow diagram and to-do list may be treated as separate regions by the techniques herein and each may be analyzed separately. For example, optical character recognition could be performed on the to-do list in order to get the text associated with each item in the to-do list. As noted above, each item in the to-do list may have associated therewith an avatar or other marker indicating an owner of to-do item. Turning to the flow diagram, the techniques herein may detect the shape of each item in the flow diagram, and any text inside each block of the flow diagram. This may then be converted into a graphical format indicating the process depicted by the flow diagram and may be associated with metadata stating that it is a process flow.

After each region in the picture is detected, and analyzed, a corresponding structured document can be created to represent the digital image. For example, the detected to-do list may be structured as text in a bulleted list and/or in a table. As one example, each item in the to-do list may be part of a table with a column to the right indicating the owner, which was determined during the analysis of the image. As another example, the to-do list may be structured as a bulleted list with the owner at the end of the to-do item in parenthesis. This table or a to-do list may be represented in any appropriate structured format, such as XML, or HTML. The process flow may be structured as graphical elements, such as rectangles and diamonds, with text inside each of the blocks. The shapes, text, and order of the process may be determined based on the analysis performed on corresponding region of the digital image.

The portions of the document created based on the different regions can be combined into a single structured document. For example, the to-do list may be placed above the process flow, because it was drawn above the process flow in the original digital image. Alternatively, the process flow may be placed above the to-do list if a structed marker indicates that the structured document should be created in that manner. After the structured document is created, it may be published to the owner, or original requester of the creation of the structured document, and/or published to a broader audience. In various embodiments, it can be beneficial to post only to the original requester so that the original requester can make any changes and/or corrections to the document before it is published to a broader audience. For example, turning to the example above, the structured document may be presented to the original requester, and the original requester may modify the document in order to put the process flow above the to-do list. Alternatively, the document may be presented to one or more collaborators indicated by one or more corresponding avatar markers.

The original requester or collaborators may also make any changes to text or other material determined during the analysis of the digital image. Such changes, and various embodiments, may not be limited to just correcting errors or typos and/or movement. For example, the original requester may add sections, delete sections, or modify those sections in any way that is appropriate. For example, the original requester may add a title to the structured document and indicate general information about the process and to-do list. Further, the original requester may add and/or delete one or more items from the to-do list. For example, if one of the items in the to-do list has already been completed, the original requester may delete that item. Further, if a new item should be added to the to-do list that was not in the original digital image, the requester may add that item to the to-do list. Alternatively, any collaborator who has received the structured document corresponding to an avatar marker may be able to make these changes as well.

In embodiments where the document is presented only to the requester, once the requester is done updating and/or modifying the structured document created based on the digital image, the requester may publish that document for consumption by a wider audience, such as the group or team that worked on the project, to a company.

2.0 Process Overview

FIG. 1 illustrates an example process 100 that may govern operation of an embodiment. Process 100 begins by receiving 110 a digital image. The digital image is then sent 120 to and received 130 by a separate component or device to analyze 140 the image and detect separate regions of the digital image. The separate regions are analyzed 150 and a structured document is created 160 based on the analysis of the separate regions in the digital image.

At step 110, the digital image, in various embodiments, may have been captured using a camera or other digital photography device capable of capturing a digital image. The digital image may be a digital image captured in real-time by a digital photography device or an existing digital image captured at a past time and stored in digital memory before being received. The digital image may comprise all or part of a collaborative environment which may contain a collaborative medium, such as a whiteboard, a large piece of paper, a blackboard, a wall, a wall with dry-erase paint, a glass pane, or a computer screen/touch screen on which has someone has drawn information that may later be summarized as a structured document. Receiving the digital image may comprise accessing a computer memory, and/or receiving a transmission over a transient media and/or receiving the image in a non-transient media. In various embodiments, an image reception system or device may capture, store and/or receive the digital image.

At step 120, the digital image is sent for analysis. The sending may be done by the image reception system or any other system or device necessary to send a digital image. Sending the digital image may comprise accessing a computer memory and/or transferring data over a network or a transient media. In various embodiments, the digital image is sent from a first particular data location on a system or device to a different second particular data location on the same system or device. In various embodiments, the digital image is sent from a first particular data location on a system or device to a separate and different second data location on a system or device.

At step 130, the sent digital image is received. Reception of the digital image may include reception of any data including digital image data as necessary to perform process 100. The reception may be performed as appropriate via a network, function call, application program interface, and/or system calls or remote procedure calls. In various embodiments, the reception may occur at an image analysis system or device or any other system or device capable of receiving a digital image. The image analysis system may be the same system as the image reception system discussed above, or a separate system utilizing separate computer hardware and/or software. In various embodiments, separate image reception systems and image analysis systems are coupled through a network to send and receive digital images as discussed below. Receiving the digital image may comprise accessing a computer memory, and/or receiving a transmission over a transient media and/or receiving the image in a non-transient media. In various embodiments, an image reception system or device may capture and store the digital image simultaneously without user input.

At step 140, the received digital image is analyzed to detect one or more regions of the digital image which are distinct. A region may be any subset of a digital image or digital image data. Detection may be done by a separate system or device which received the digital image in step 130, or the same system, such as the image analysis system described above. Detecting one or more regions may be accomplished using any appropriate technique and/or system. For example, bounding boxes may be determined and placed around similarly situated areas of the digital image in order to break the image into regions associated with all or a subset of the bounding box. An example of a software package that could be used for such analysis 140 is Tesseract. In various embodiments, the analyzed digital image contains only one district region which may be the entire digital image or a subset of the digital image. In various embodiments, the regions of the digital image are subsets of pixels of the digital image grouped together in a data structure. In various embodiments, an analyzed digital image may comprise one or more "dead regions" which may be discarded by the system as containing irrelevant or no data. In various embodiments, only a portion of the entire digital image is analyzed to detect the one or more regions.

In various embodiments, the image analysis system may detect a region comprising a relevant data item, such as a table, by detecting the grid of lines encompassing the table. A bounding box may be then placed around relevant data item in order to indicate that the relevant data item is itself a single distinct region and should be analyzed as such. Further, a relevant data structure such as a bulleted list may be detected by detecting a preamble for the bulleted list and the bullets followed by text for each item in the list, and a bounding box may be placed around the bulleted list in order to indicate that it is a distinct region corresponding to a bulleted list. In various embodiments, single or multiple lines that are in written or printing in a larger text format may be detected as headers. In various embodiments, if a large text is near the top of a distinct region, a subset of distinct regions and/or the digital image overall, the large text may be interpreted as a header for that particular region, subset and/or for the entire digital image respectively. For example, large text at the top of a whiteboard may be determined to be a header or title for all of the content and all of the regions on the white board in the digital image. Larger text at or near the top of a region, such as a to-do list and/or a table may be determined to be a header for that region.

In various embodiments, analysis of the distinct one or more regions may include detection of physical or drawn markers detected in the digital image. Detection of markers may occur during the analysis of the region and/or during any other step in the process 100. As an example, a marker may be recognized by the analyzing system as a to-do list marker, and if the to-do list marker is near a bulleted list, the to-do list marker may indicate that the bulleted list is a to-do list and should be analyzed as such. As discussed elsewhere herein, avatar markers or other user markers indicating individual real-world users may also be detected in the digital image. Markers can be detected for any and/or multiple regions or subsets of a region of a structured document. For example, there may be one or more markers for headers within the digital image, one or more markers for authors or owners of sections, one or more markers for assignees of tasks.

A header marker may indicate that text near the header marker and/or pointed to by the header marker are headers. Other markers may be present in the digital image that indicate other aspects of a structured document, such as process markers indicating that a region is a process description, structure markers indicating order or placement within the structured document, for example, regions may re-ordered from the original presentation of the regions in the digital image to a different ordering in the produced structured document, table markers for tables, timeline markers for timelines, comment markers for comments Further, there may be, in various embodiments, null markers that indicate that a particular section of a digital image is null and should not be reproduced in the structured document. In further embodiments, a null marker may indicate that during the determination of regions, a region having a null marker will be ignored or included with determined dead regions in the digital image or should not be subjected to analysis 140.

In various embodiments, the markers may be physical items, such as stickers or magnets with distinctive patterns, colors, that are placed on to a whiteboard or other drawing. The markers may also be drawn onto the whiteboard and/or other document manually by a user or digitally through systems such as a touchscreen display. For example, a marker indicating that something is a heading may be drawn onto the whiteboard with a dry-erase marker to indicate that certain text is to be analyzed as a heading. In various embodiments, the markers contain or correspond to QR codes or other digitally recognizable formats that can indicate the intent of the inclusion of the marker on the collaborative medium. The markers may also be pictures, icons, emojis, text, magnets, or anything else appropriate to perform the function of a marker as described herein. For example, in various embodiments, there may be QR markers having QR code displayed on the marker which when analyzed by a system, cause the system to access a web-link and include information from the weblink in a structured document.

In various embodiments, avatar markers that indicate particular user permissions to a structured document may be used and placed on the collaborative medium, for example, for use to indicate owners of tasks, authors. In various embodiments, markers are not initially present on the collaboration medium, but are added digitally by one or more users prior to the analysis and detection of regions. In various further embodiments, one or more users may add or delete markers digitally subsequent to the analysis and detections of regions and reperform the analysis and detections of regions. In various embodiments, a system may perform analysis 140 of the digital image to detect one or more regions regardless of what markers are present in the digital image. In various embodiments, one marker may belong to or correspond to more than one region of the analyzed digital image. In various embodiments, two or more markers may belong to the same region of the analyzed digital image.

At step 150, the individual one or more regions detected in step 140 will each be further analyzed. Further analysis may be done by a separate system or device than that which analyzed the image at step 140 or the same system or device, such as an image analysis device described above. Analyzing a region may include detecting sub-elements within that region, including, but not limited to, text, drawings, images, charts, to-do lists, tables, and/or user avatar icons or markers. For example, if a region includes a to-do list, then the text associated with each item in the to-do list may be detected using optimal character recognition or any other appropriate technique. Similarly, a region that is a table may have optical character recognition performed on the pixels in that region in order to determine text which corresponds to specific locations in each cell of the table. Further, any markers detected within a region may be analyzed and recognized in order to better present the region in the eventual structured document. In various embodiments, the system may perform any of a number of image recognition techniques on the markers and compare the resulting data against a database or repository containing data pertaining to valid markers to confirm the existence of a marker in a distinct region.

In various embodiments, aspects of any text analyzed in each of the one or more regions may be used in the future creation of the structured document. For example, a markup or markdown language may be used in the drawing captured by the digital image, and that markup or markdown may be used to create the appropriate font in the structured document. For example, text with an underscore before and after it may be shown in the structured document as being in italics, or text with an asterisk before and after it may be shown in the structured document as being bolded. In various embodiments, text may be analyzed which corresponds to source code in a programming language. In various further embodiments, analyzing source code may cause execution of a source code command on a system which analyzed the text or a system which will create the structured document.

At step 160, the structured document is created based in whole, or in part, on the analysis 150 of the one or more regions. For example, information detected as a to-do list in a distinct region may be presented as a to-do list in the structured document. Information represented as a table may be presented as a table in the structured document. Headers may be presented as text headers or enlarged text at the top of the structured document. In various embodiments, the markers themselves will not be represented in the structured document visually, and instead the markers will correspond to metadata associated with the structuring of the document. As an example, a header marker may indicate that the structured document should use fonts and font sizes associated with headers to present the text associated with the header. In various embodiments, the relative positioning of each region on the collaborative medium or a corresponding structure marker may be used to determine the relative positioning of any object as created in the structured document. For example, a first analyzed region that is physically drawn above a second analyzed region in the digital image may refer this positioning to the structured document where a corresponding first item is presented above a second item in the structured document.

In various embodiments, the type of content within a region may dictate its placement within the structured document. For example, a first region indicating a header text may be placed at the top of the document, regardless of its placement in the digital image. A second region associated with a general overview text may be placed just below that in the structured document regardless of whether the general overview text was above the header text on the collaborative medium. A third region associated with a timeline may be presented third in the document if rules pertaining to the system creating the structured document indicate that all timelines are presented third. The structured document creation may be done by any of the systems described above or a separate system, such as a document creation system.

In various embodiments, which are not depicted in FIG. 1, one or more regions may be automatically determined by partitioning the collaborative medium into two or more regions, regardless of the positioning of markers. For example, a collaborative may be split into two equal regions by a dividing line bisecting the medium vertically, or split into four equal regions by two dividing lines bisecting the medium vertically and horizontally.

In various embodiments, which are not depicted in FIG. 1, after the structured document is created, it may be presented to, shared with, a requesting user account for additional viewing, modifications and/or further publication. In various embodiments, only a user device having dictated the operation of process 100 may see the resulting structured document. In various embodiments, the structured document could be presented to, made available, or shared with more than just the dictating user device. For example, the document may be shared with a set team associated with the digital image and/or requesting user account. In various embodiments, users having user accounts may be given access to the created structured document according to the permissions of the user account and regardless of which device the account is associated with.

In various embodiments, the structured document may be published for viewing or editing by others. In various embodiments, the presenting or sharing of documents may be based on avatar markers captured in the digital image and analyzed in a region. In further embodiments, the permissions of a user or a user account may be based on a combination of a marker captured and/or other data associated with the user or the user account. For example, a marker may indicate that a user may have access to a document, but an existing access on a user account made by an administrator may override the permissions set by a marker by specifying that a user cannot have access to a set of documents. In various embodiments, the permissions of a user or a user account may be only partially permissive. For example, a marker may indicate that a user only has access permissions, and no modification permissions. In such a case, a user may view the structured document as a read-only file and may not edit all or a portion of the structured document.

In various embodiments, the image reception system, the image analysis system and the document creation system operate separately and in communication among each other via a network as described below. In various embodiments, the three systems are conceptually separate, and operate as a single program or set of programs on one or more devices. In such embodiments, communication among the systems may be performed via procedure calls, function calls, or any other method of sharing information between programs. In various embodiments, the three systems operate on the same system or device. In various further embodiments, the system may comprise a single program having separate components that correspond to the three systems.

3.0 Example Systems

Figure 2:
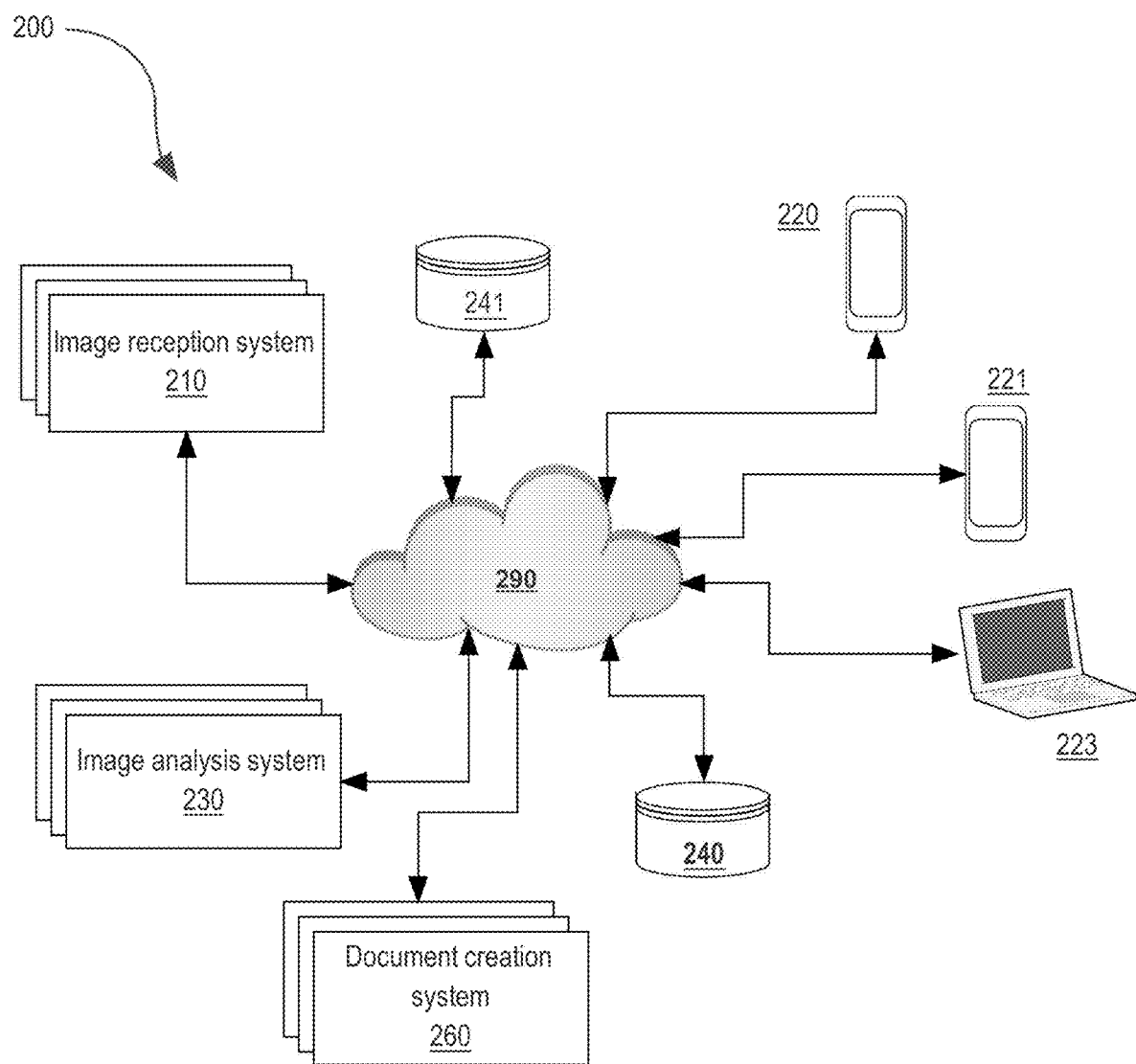
FIG. 2 illustrates a system that may be used to implement an embodiment.

FIG. 2 depicts an example system for document creation based on digital images. In various embodiments, the example system 200 may execute the steps of process 100 using multiple systems. Multiple systems 210-260 are connected by a network 290. Network 290 may be any appropriate local area network, internet, and/or other types of networks or communication mechanisms, including those discussed herein. Coupled to network 290 is an image reception system 210. As discussed above image reception system 210 may be used to receive 110 new digital images and send 120 them to the image analysis system 230. The image analysis system 230 is coupled to network 290 and may perform certain aspects of the image analysis discussed elsewhere herein, such as receiving 130 the digital image, analyzing 140 the digital image to detect one or more regions, and analyzing 150 the one or more detected regions. The document creation system 260 is also coupled to network 290. It may be used to create structured documents based on the analysis 150 of the one or more detected regions in the digital image, as discussed elsewhere herein, for example, with respect to process 100.

Also depicted in system 200 are one or more network-attached storages or storage systems, storage 240 and storage 241. These storage systems 240 and 241 may be used to store digital images. analyzed on unanalyzed, and/or structured documents. As depicted in system 200, one or more user devices 220-223 may be coupled to the network 290. These may be used to capture digital images to send to the image reception system 210, and/or to receive the structured document from the document creation system 260. In various embodiments, one or more of user devices 220-223 may initiate the process 100 to create a structured document by communicating over the network 290 with any of the systems discussed herein. In various further embodiments, process 100 starts automatically on systems 210, 230, and 260 when a user device 220-223 has sent a digital image to image reception system 210.

4.0 Additional Examples

Figure 4:
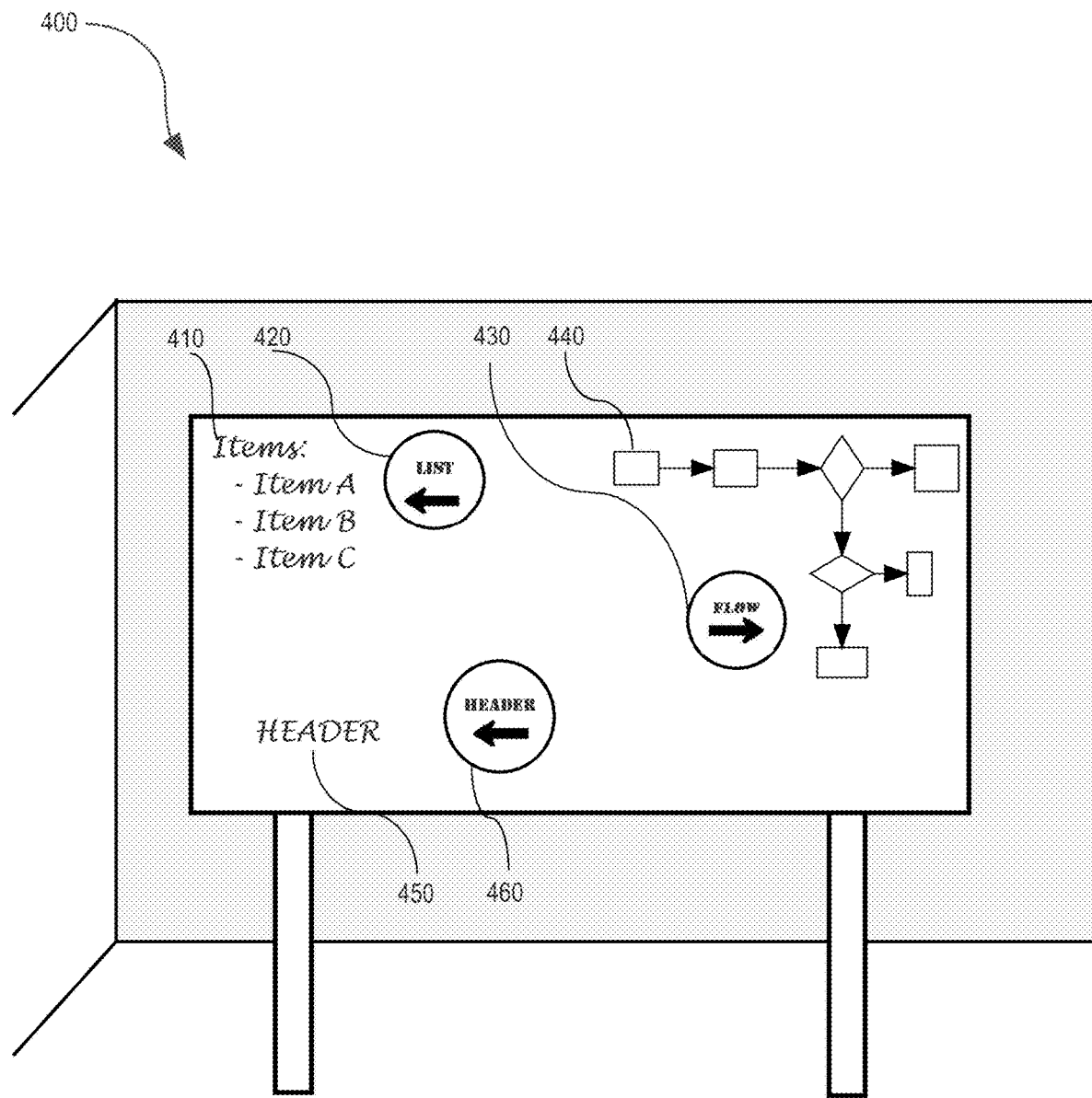
FIG. 4 illustrates a collaboration image according to an embodiment of the invention.

FIG. 4 depicts a collaboration space which may be the subject of a digital image for the purposes of creating a structured document according to an embodiment of the invention.

Collaborative environment 400 may comprise a collaborative space which may be any real or virtual space containing a collaborative medium on which users, collaborators or any other necessary entity may interact with the collaborative medium to organize, modify, disseminate, create, and/or manipulate relevant information. The collaboration medium may be any physical or digital manifestation on which information can be displayed and manipulated. For example, the environment of FIG. 4 depicts a whiteboard in room which members may write on, erase from, or in any other manner necessary, modify information thereon. Examples of other collaborative media may be a chalkboard, a notepad, a digital computer or monitor screen, a glass pane, or any other media on which information can be displayed and modified as necessary.

List item 410 depicts a list of items which are written on the collaborative medium according to an embodiment of the invention. A list item is an example of an information item which may be written, drawn, and/or modified in any other way sufficient to represent a list item on the collaborative medium for captured in a digital image. List marker 420 depicts a list marker attached to the collaborative medium which indicates a corresponding aspect of list item 410 to aid in analysis of the list item as described herein, according to an embodiment of the invention. Specifically, list marker 420 indicates that list item 410 is a list and should be analyzed by an analyzing system as such. In various embodiments, distinct information items such as list item 410 may be analyzed by a system without the use of a marker such as list marker 420. For example, an analyzing system may analyze the structure of list item 410 as a drawn by a user and discern that the shape of list item 410 is a list, without the aid of a corresponding marker.

In various embodiments, a marker may be a physical image marker or any physical manifestation of a marker which indicates an aspect of the environment, collaborative medium, or an information item attached to a collaborative medium. In various embodiments, the markers are physical items independent of the collaborative medium which may integrated into or removed from the collaborative medium without losing or modifying the properties of the marker. For example, markers on a whiteboard may be represented by magnetic buttons having properties recognizable by an analysis system. Such magnetic buttons may be detachable and movable around the collaborative medium at will by a user or other collaborator.

In various embodiments, the markers are drawn onto or integrated into the collaborative medium in the same manner that information items are integrated into the collaborative medium. For example, a user or other collaborator utilizing a whiteboard as a collaborative medium may draw the marker in the same draw-erase ink any information items are also drawn in. In various embodiments, markers may be digital and may be added at any stage of analysis of the digital image manually through a digital user interface or autonomously by a digital program. For example, a post-processing application integrated into a user device 220-223 may capture a digital image of the collaborative medium and add digital markers to the digital image prior to sending the digital image to a reception system and beginning the process 100.

Flow marker 430 depicts a marker corresponding to flowchart item 440 displayed on the collaborative medium. Header item 450 depicts a header information item displayed on the collaborative medium. Header marker 460 depicts a marker corresponding to header item 450 and indicates that header item 450 should be analyzed as a header.

In various embodiments not pictured in FIG. 4, information items or markers may be depicted by multiple collaborative mediums. For example, an image item drawn on a separate piece of paper may be attached to a whiteboard and a corresponding image marker may be placed next to the attached piece of paper on the whiteboard, indicating a collaborators intention to group the image item in the same analyzed region as the image marker.

Figure 5:
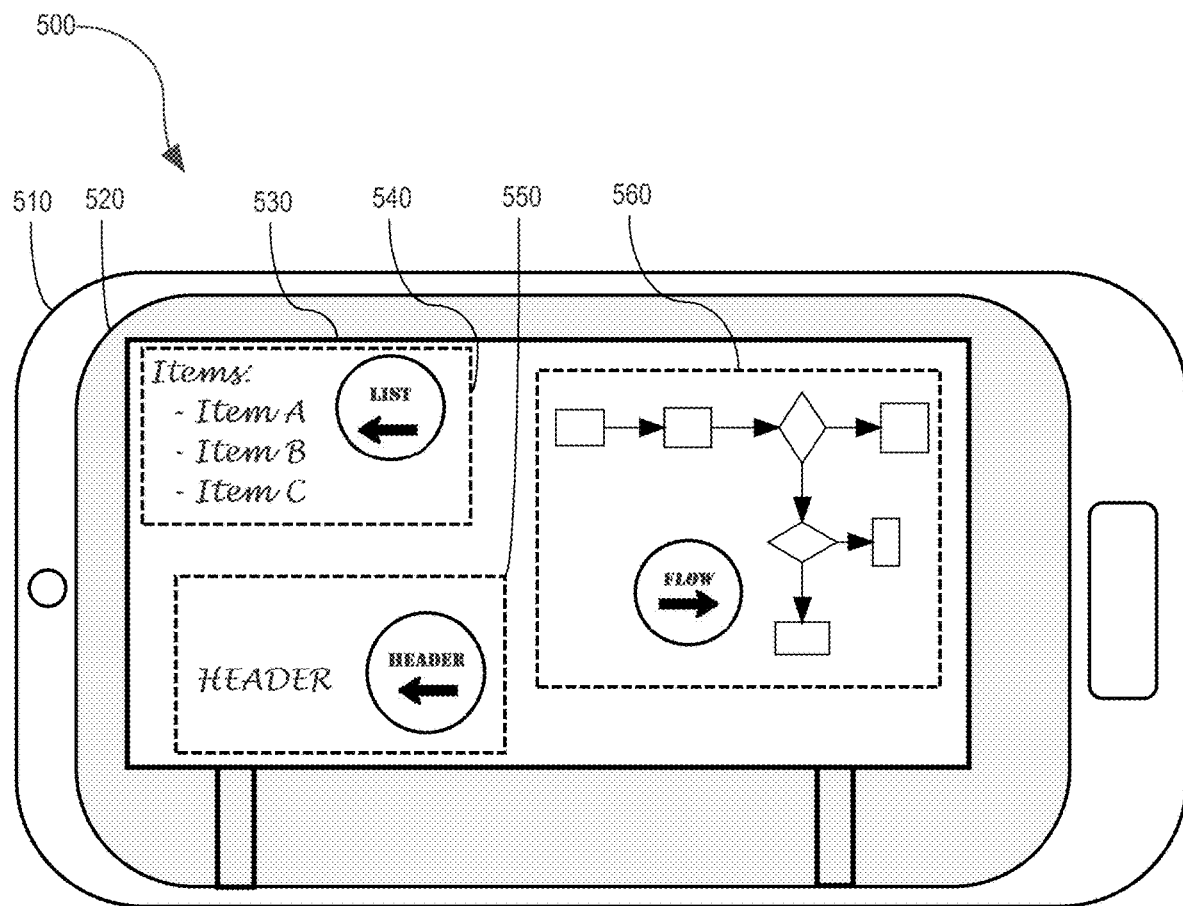
FIG. 5 illustrates a digital image according to an embodiment of the invention.

FIG. 5 depicts the collaboration environment 400, including the collaborative medium, as captured in a digital image and displayed on a device according to an embodiment of the invention.

Image capture state 500 depicts an embodiment in which a digital image has been captured comprising the environment 400 discussed above. The capturing of the image may be done by a mobile device 510 which may be one of user devices 220-223 or any other device capable of capturing a digital image. In various embodiments, mobile device 510 captures the digital image using built in hardware and/or software to in the mobile device. In various embodiments, mobile device 510 may receive the digital image from a different system, including a different user device. In various embodiments, device 510 may be any combination of image receptions device 210, image analysis device 230 and/or document creation system 260. The digital image may be displayed on a device display screen 520. The digital image may include a digital image representation 530 of any or all portions of the collaborative medium on the device.

Analyzed region 540 depicts a graphical representation of a region according to a digital image which has been analyzed for regions as described in process step 140. In various embodiments, the regions may be analyzed but no visual representation of the analysis or region is displayed on the device. Analyzed region 540 shows the result of region analysis 140 in which list item 410 and corresponding list marker 420 have been placed in the same region. Analyzed region 550 shows the result of a region analysis wherein header item 450 is grouped with corresponding header marker 460. Analyzed region 560 shows the result of a region analysis wherein flowchart item 440 is grouped with corresponding flowchart marker 430.

Figure 6:
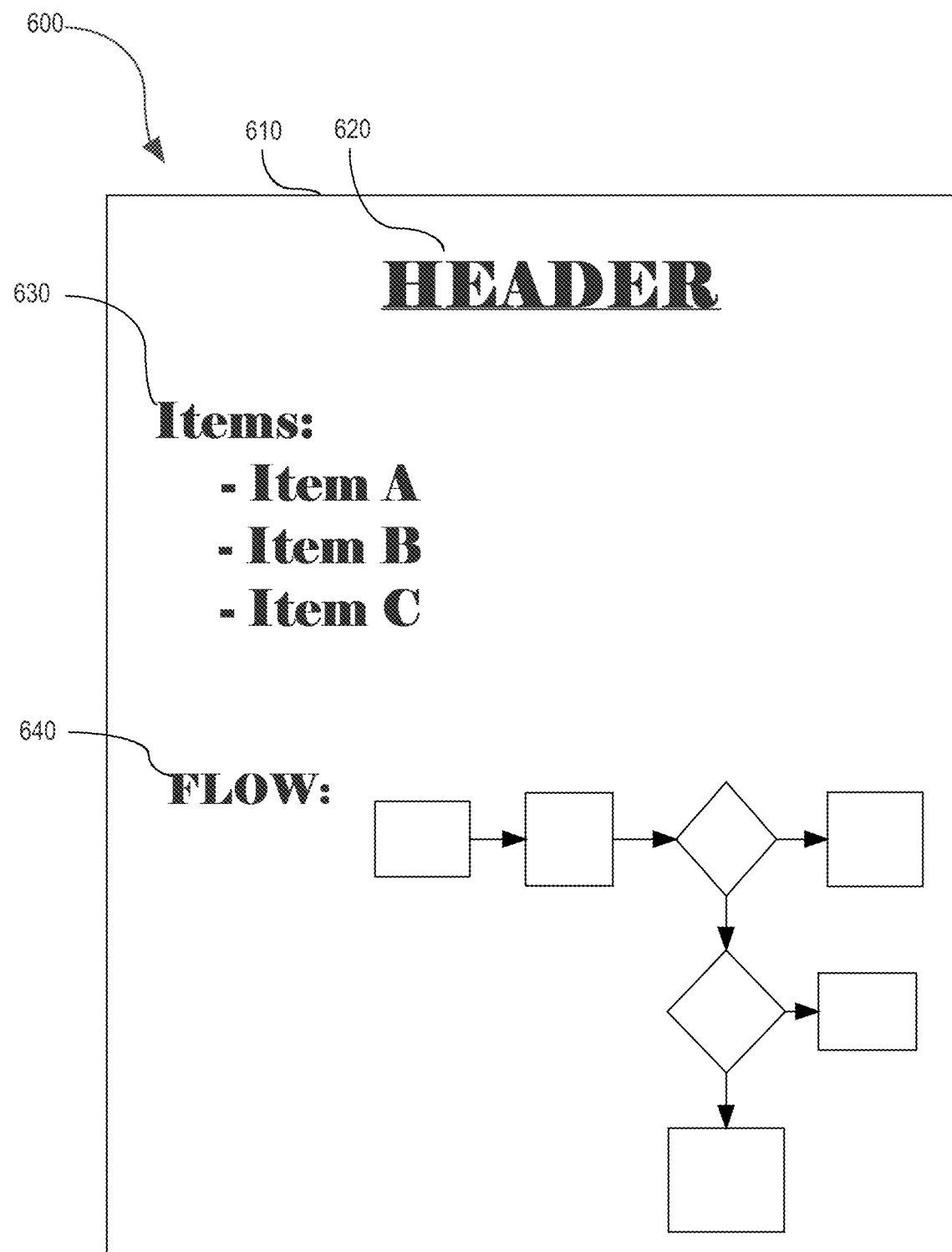
FIG. 6 illustrates a structured document according to an embodiment of the invention.

FIG. 6 depicts a structured document created based on digital image analysis according to an embodiment of the invention.

Structured document 600 depicts a document created based the analysis 150 of the regions 540-560 and the creation 160 of a corresponding structured document. Structured document 600 may be any kind of document suitable for creating and/or displaying a structured document 510. In various embodiments, structured documents 600 may be created and/or displayed on any of the systems described herein or a separate independent system.

In various embodiments, a structured document 600 may be a document based on any word processing file formats or text-based formats and/or a digital document application program. For example, a structured document may be a file comprising a data format in any of a .docx, .txt, or .html format or any other format capable of fulfilling document creation step 160. In various embodiments, the structured document may be created 160 prior to steps 110-150 of process 100 and subsequently populated by content after the one or more regions have been analyzed 150.

Structured display 610 depicts a display medium capable of displaying structured information items as described herein. For example, structured display 610 may be a digital representation of a document page which can be populated by text, images, charts, or any other structured information items.

Structured header item 620 represents content in structured document 600 displayed on structured display 610 corresponding to the analysis of header item 450 and header marker 460 inside region 550. Structured list item 630 represents content corresponding to the analysis of list item 410 and list marker 420 in region 540. Structured flowchart item 640 represents content corresponding to the analysis of flowchart item 440 and flowchart marker 430 in region 560.

Structured document 600 represents the content of collaborative environment 400 based on region analysis on collaborative medium 530. For example, structured document 600 displays, on structured display 610, a header, a list, and a flowchart. A header may be content in a structured document that contains text in a font and location that may be determined by the analysis of a header item such as header item 630 and a header marker, such as header marker 460. In various embodiments, header marker 460 may cause the creation of structured header item 620 to be displayed in structured document 600 at the top of the document. A list may be content in a structured document that contains text in a list form that may be determined by the analysis of a list item, such as list item 410 and a list marker, such as list marker 420. A flowchart may be content in a structured document that contains flowchart items that may be determined by the analysis of a flowchart item such as flowchart item 440 and a flowchart marker, such as flowchart marker 430.

Figure 7:
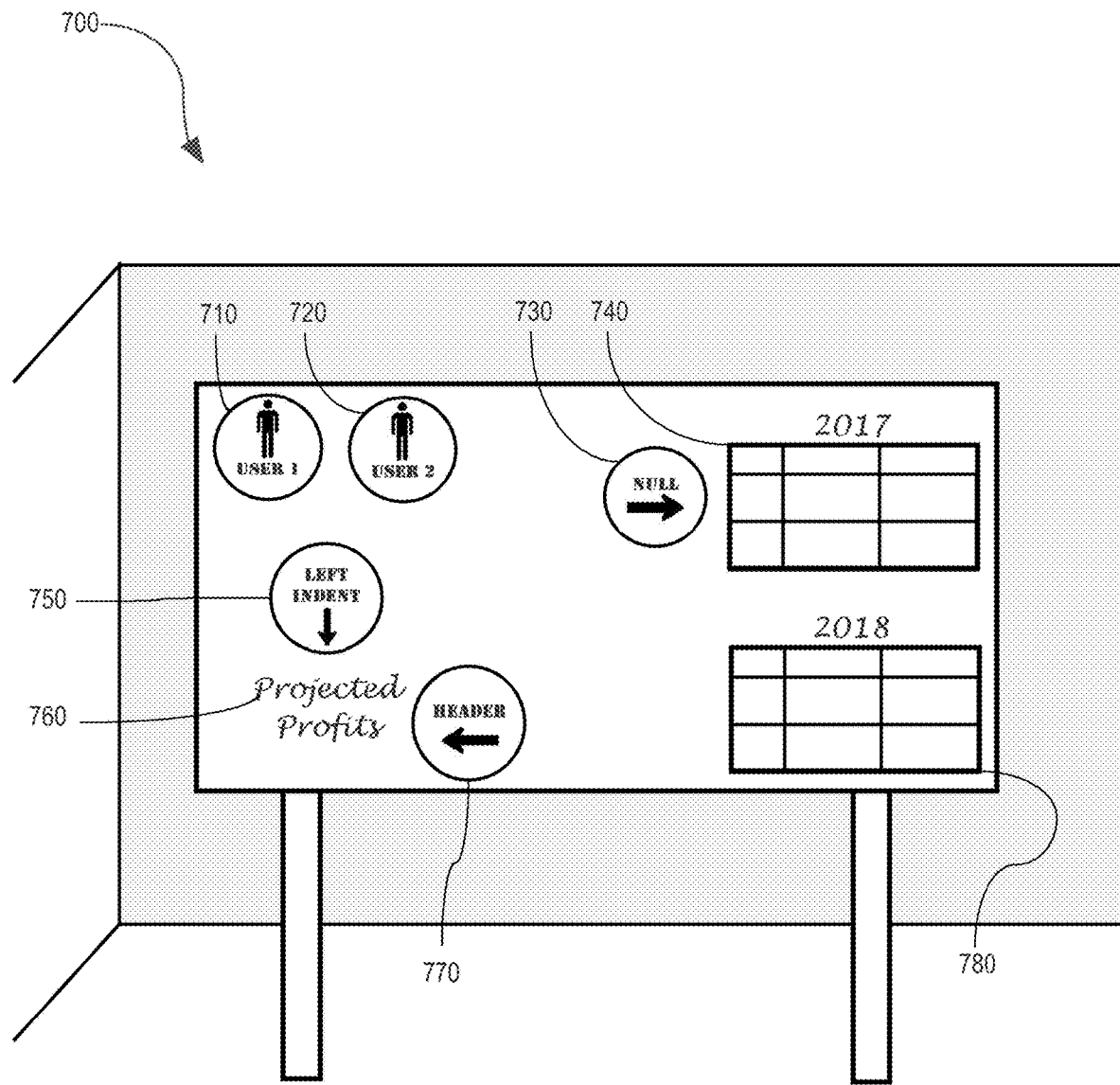
FIG. 7 illustrates a collaboration image according to an embodiment of the invention.

FIG. 7 depicts an additional embodiment of a collaboration space which may be the subject of a digital image for the purposes of creating a structured document according to an embodiment of the invention.

Collaborative environment 700 may be any real or virtual space, like environment 400 or different. For example, the environment of FIG. 7 also depicts a whiteboard in a physical room which collaborators may write on, erase from, and/or modify in any other manner.

User marker 710 is a marker identifying and associated with a user, specifically USER 1. In various embodiments, user marker 710 may be associated with an individual user, a group of users, or an entity such as a company or business entity. In various embodiments, user marker 710 may be a restrictive marker, corresponding to a user whose access to a structured document may be more restricted when the structured document is shared.

User marker 720 is a marker identifying and associated with a user, specifically USER 2. In various embodiments, user marker 720 is aesthetically almost like user marker 710 but may correspond to a different user. In various embodiments, a marker may be analyzed at step 130 or 140 differently based on the specific user a user marker corresponds to.

Null marker 730 depicts a marker which indicates an aspect an information item which will be treated as excluded from a structured document. For example, null marker 730 indicates that table item 740, which includes a title item representing a year and drawn above the table, is to be analyzed as a null object in step 150. Table items may be in any format necessary to convey to an analyzing system that a table is drawn on the collaborative medium, including the use of rows, columns and/or titles. In various embodiments, a null marker may further indicate only a subset of information items which will not be added to the corresponding structured document. For example, an image null marker may be a type of null marker which will indicate that all image items in a region with the null marker are to be excluded from a structured document, but any other non-image items should be included in a structured document.

Header item 760 depicts an item represented on the collaborative medium in collaboration environment 700. Header marker 770 is placed next to information item 760 on the collaborative medium and may operate similarly to header marker 460 in collaboration environment 400. Left indent marker 750 is also placed next to header item 760 and on the collaborative medium. Table item 780 depicts a table item on the collaborative medium with a title item representing a year and drawn above the table. In various embodiments, an information item may be analyzed by a system based on the shape or content of the item without requiring a marker to identify the item. For example, a table depicted as table item may be of a shape and format recognizable by an image analysis device such that the device may analyze the table, its title, and its contents regardless of whether a corresponding table marker is in proximity to the table.

Figure 8:
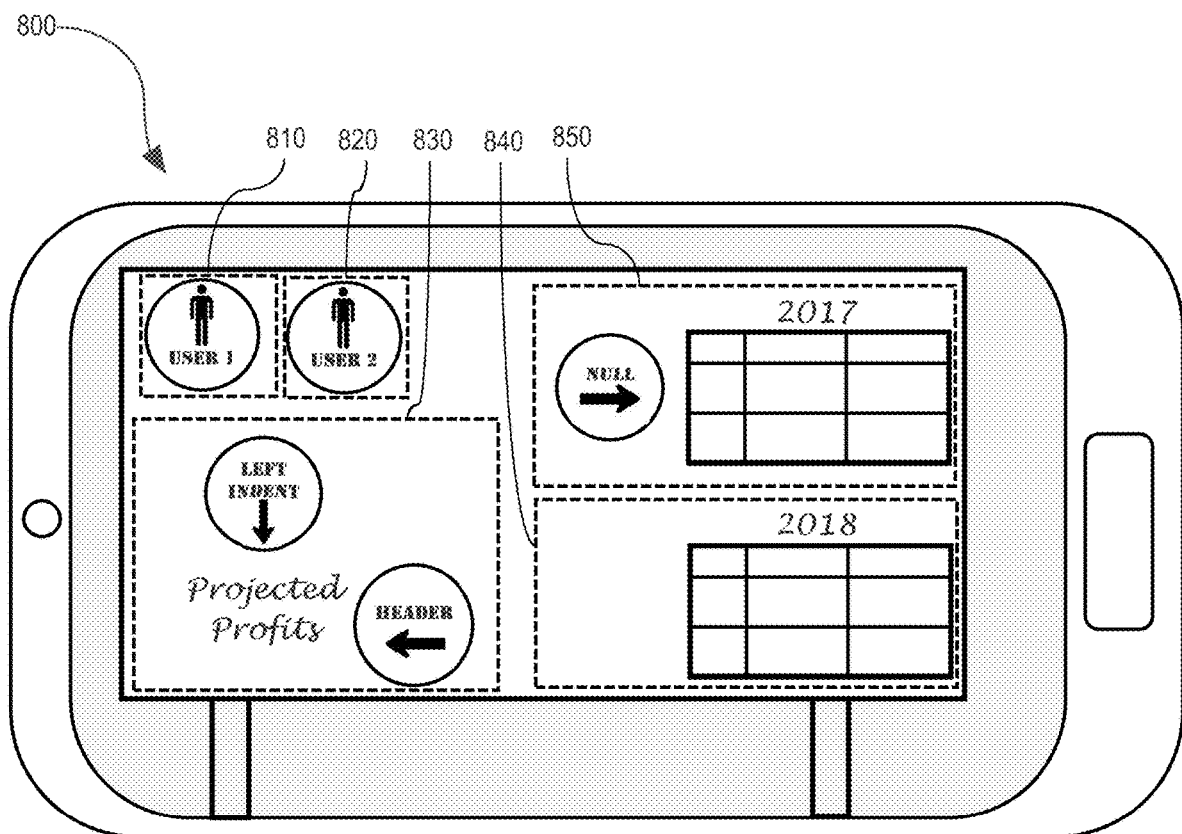
FIG. 8 illustrates a digital image according to an embodiment of the invention.

FIG. 8 depicts the collaboration environment 700, including the collaborative medium, as captured in a digital image according to an embodiment of the invention.

Image capture state 800 depicts an embodiment in which a digital image has been captured comprising the environment 700 discussed above. Image capture state 800 may be like image capture state 500 or different. The capturing of the image may be done by a mobile device 810 which may be one of user devices 220-223 or any other device capable of capturing a digital image. In various embodiments, mobile device 810 captures the digital image using built in hardware and/or software to in the mobile device.

Analyzed region 810 depicts a graphical representation of a region of the digital image. Analyzed region 810 is the result of region analysis 140 in which user marker 710 corresponding to USER 1 is analyzed. Analyzed region 820 is the result of the region analysis 140 in which user marker 720 corresponding to USER 2 is analyzed. In various embodiments, markers corresponding to users may be grouped into one region regardless of their proximity to each other on the collaborative medium.

Analyzed region 830 is the result of the region analysis 140 in which left indent marker 750, header marker 770 and header item 760 are analyzed and grouped into a region. Analyzed region 840 is the result of the region analysis 140 in which table item 780 is analyzed and placed in a corresponding region. Analyzed region 850 is the result of the region analysis 140 in which table item 740 and null marker 730 are grouped into a region.

Figure 9:
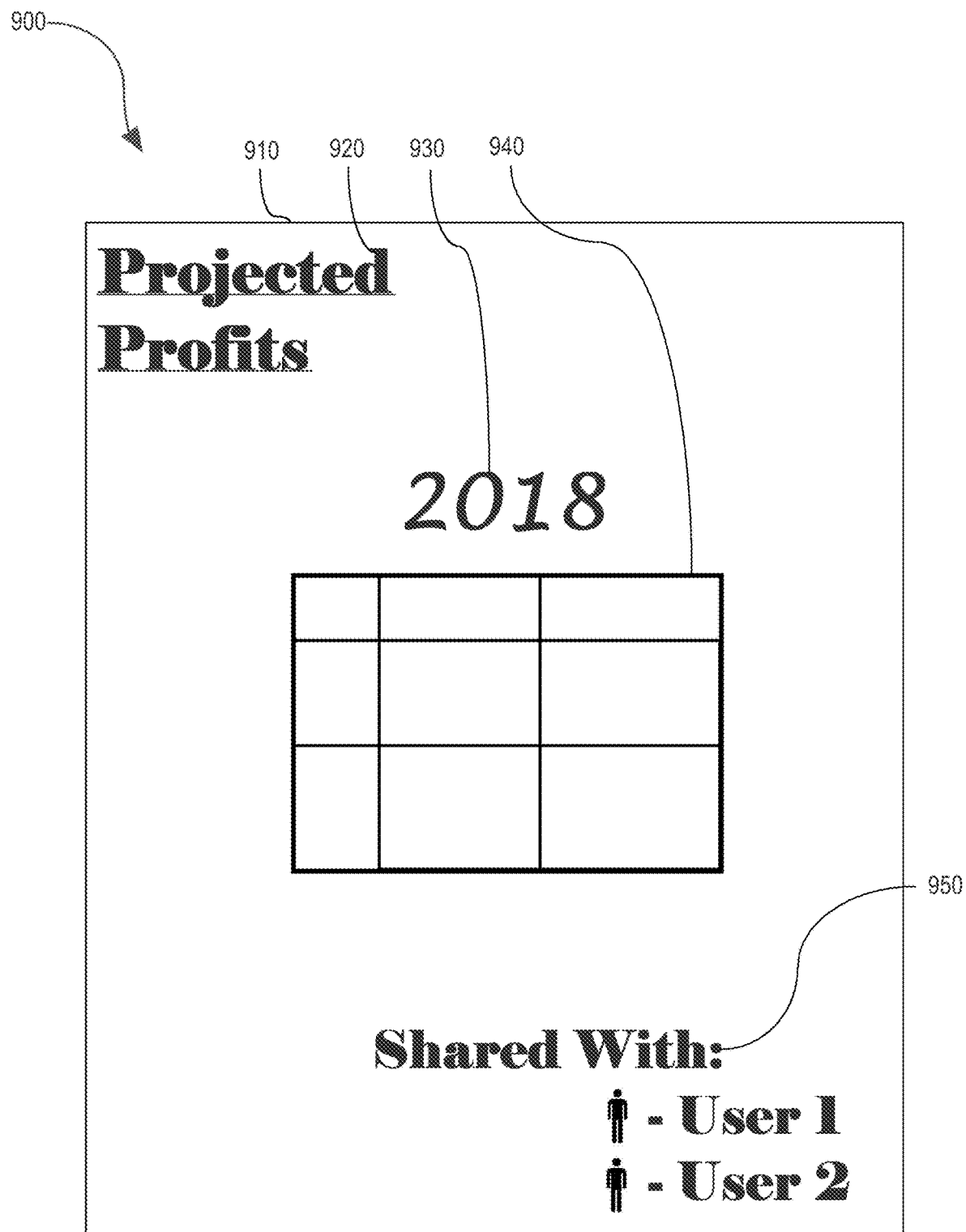
FIG. 9 illustrates a structured document according to an embodiment of the invention.

FIG. 9 depicts a structured document created based on digital image analysis according to an embodiment of the invention.

Structured document 900 represents the content of collaborative environment 700 based on region analysis on collaborative medium 830. For example, structured document 900 displays, on structured display 910, a header, a table, and user permissions. Structured header item 920 represents content in structured document 900 corresponding to the analysis of header item 760 and left indent marker 750 and header marker 770 inside region 830. Structured item 920 is a header item like structured item 620 but has been indented to the left side of the structured document in accordance with system recognition and analysis of indent marker 750 at step 150.

Structured text item 930 represents content in structured document 900 corresponding to the text title of information item 780 in region 840. The analysis of region 840 may not require a marker to discern that information item 780 is a table with title text which has been added to structured document 900. Similarly, structured table item 940 represents table content in structured document 900 corresponding to a table which structured item 930 describes.

Structured table item 740 and null marker 730 are absent from structured document 900 due to the analysis of region 850 and the identification of a null marker. Structured user item 950 represents an item of structured document 900 depicting the users the document is shared with. For example, in accord with the user markers corresponding to USER 1 and USER 2, structured user item 950 shows that the structured document has been shared with a first and second user. In various embodiments, users corresponding to physical user markers have access to the structured document based on the user markers that are displayed on the collaborative medium. In various embodiments, a structured document will add structured image items such as user avatars and/or pictures to depict through structured display 910 that certain users have access to the structured document.

5.0 Implementation Mechanisms—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 3:
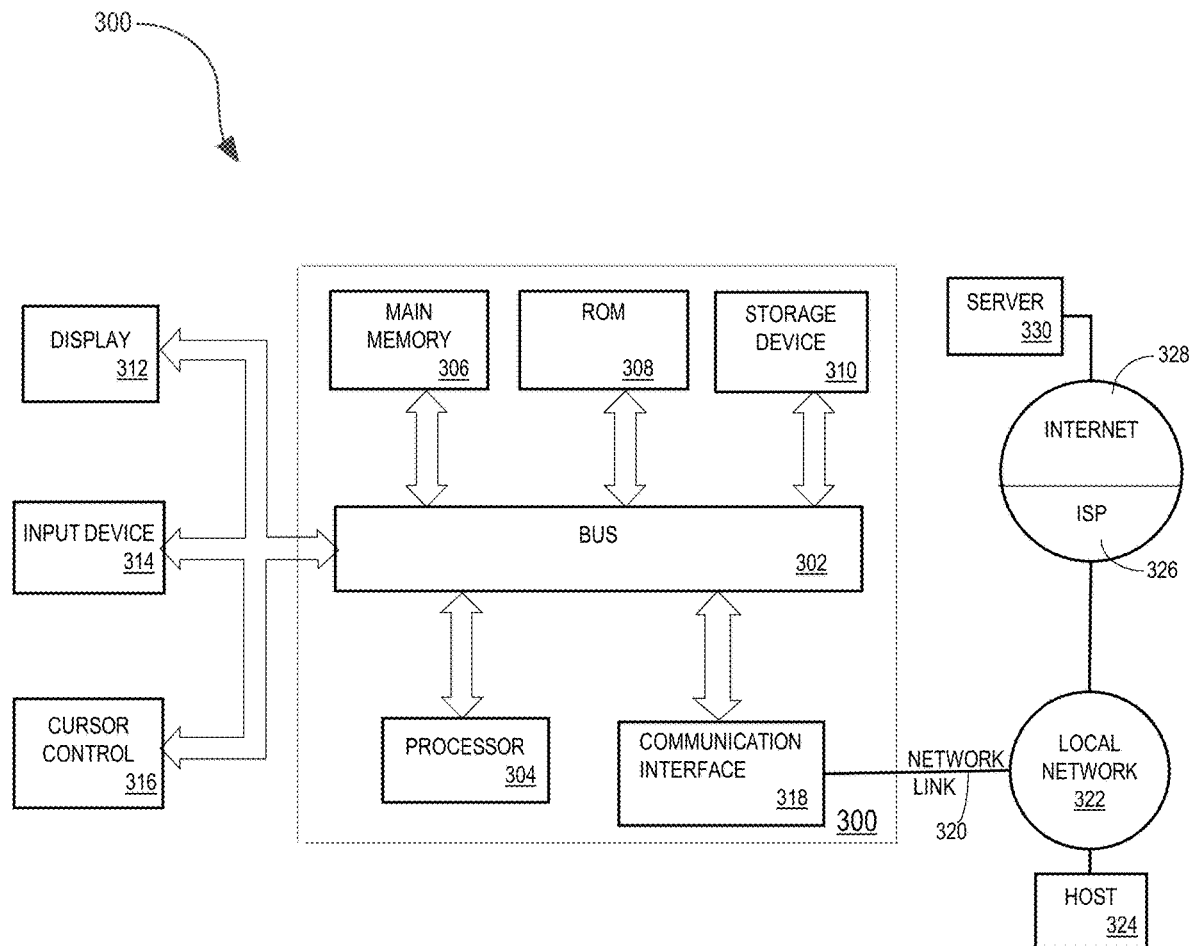
FIG. 3 illustrates an example general purpose computer system that may be used to implement aspects of an embodiment.

FIG. 3 is a block diagram that illustrates an example computer system with which an embodiment may be implemented. In the example of FIG. 3, a computer system 300 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 300 includes an input/output (I/O) subsystem 302 which may include a bus and/or other communication mechanism(s) for communicating information and/or instructions between the components of the computer system 300 over electronic signal paths. The I/O subsystem 302 may include an I/O controller, a memory controller and at least one I/O port. The electronic signal paths are represented schematically in the drawings, for example as lines, unidirectional arrows, or bidirectional arrows.

At least one hardware processor 304 is coupled to I/O subsystem 302 for processing information and instructions. Hardware processor 304 may include, for example, a general-purpose microprocessor or microcontroller and/or a special-purpose microprocessor such as an embedded system or a graphics processing unit (GPU) or a digital signal processor or ARM processor. Processor 304 may comprise an integrated arithmetic logic unit (ALU) or may be coupled to a separate ALU.

Computer system 300 includes one or more units of memory 306, such as a main memory, which is coupled to I/O subsystem 302 for electronically digitally storing data and instructions to be executed by processor 304. Memory 306 may include volatile memory such as various forms of random-access memory (RAM) or other dynamic storage device. Memory 306 also may be used for storing temporary variables or other intermediate information during execution of instructions to be executed by processor 304. Such instructions, when stored in non-transitory computer-readable storage media accessible to processor 304, can render computer system 300 into a special-purpose machine that is customized to perform the operations specified in the instructions.

Computer system 300 further includes non-volatile memory such as read only memory (ROM) 308 or other static storage device coupled to I/O subsystem 302 for storing information and instructions for processor 304. The ROM 308 may include various forms of programmable ROM (PROM) such as erasable PROM (EPROM) or electrically erasable PROM (EEPROM). A unit of persistent storage 310 may include various forms of non-volatile RAM (NVRAM), such as FLASH memory, or solid-state storage, magnetic disk or optical disk such as CD-ROM or DVD-ROM and may be coupled to I/O subsystem 302 for storing information and instructions. Storage 310 is an example of a non-transitory computer-readable medium that may be used to store instructions and data which when executed by the processor 304 cause performing computer-implemented methods to execute the techniques herein.

The instructions in memory 306, ROM 308 or storage 310 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 300 may be coupled via I/O subsystem 302 to at least one output device 312. In one embodiment, output device 312 is a digital computer display. Examples of a display that may be used in various embodiments include a touch screen display or a light-emitting diode (LED) display or a liquid crystal display (LCD) or an e-paper display. Computer system 300 may include other type(s) of output devices 312, alternatively or in addition to a display device. Examples of other output devices 312 include printers, ticket printers, plotters, projectors, sound cards or video cards, speakers, buzzers or piezoelectric devices or other audible devices, lamps or LED or LCD indicators, haptic devices, actuators or servos.

At least one input device 314 is coupled to I/O subsystem 302 for communicating signals, data, command selections or gestures to processor 304. Examples of input devices 314 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 316, which may perform cursor control or other automated control functions such as navigation in a graphical interface on a display screen, alternatively or in addition to input functions. Control device 316 may be a touchpad, a mouse, a trackball, or cursor direction keys for communicating direction information and command selections to processor 304 and for controlling cursor movement on display 312. The input device may have at least two degrees of freedom in two axes, a first axis, for example, x, and a second axis, for example, y, that allows the device to specify positions in a plane. Another type of input device is a wired, wireless, or optical control device such as a joystick, wand, console, steering wheel, pedal, gearshift mechanism or other type of control device. An input device 314 may include a combination of multiple different input devices, such as a video camera and a depth sensor.

In another embodiment, computer system 300 may comprise an interne of things (IoT) device in which one or more of the output device 312, input device 314, and control device 316 are omitted. Or, in such an embodiment, the input device 314 may comprise one or more cameras, motion detectors, thermometers, microphones, seismic detectors, other sensors or detectors, measurement devices or encoders and the output device 312 may comprise a special-purpose display such as a single-line LED or LCD display, one or more indicators, a display panel, a meter, a valve, a solenoid, an actuator or a servo.

When computer system 300 is a mobile computing device, input device 314 may comprise a global positioning system (GPS) receiver coupled to a GPS module that is capable of triangulating to a plurality of GPS satellites, determining and generating geo-location or position data such as latitude-longitude values for a geophysical location of the computer system 300. Output device 312 may include hardware, software, firmware and interfaces for generating position reporting packets, notifications, pulse or heartbeat signals, or other recurring data transmissions that specify a position of the computer system 300, alone or in combination with other application-specific data, directed toward host 324 or server 330.

Computer system 300 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 300 in response to processor 304 executing at least one sequence of at least one instruction contained in main memory 306. Such instructions may be read into main memory 306 from another storage medium, such as storage 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 310. Volatile media includes dynamic memory, such as memory 306. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 302. Transmission media can also take the form of acoustic or light waves, such as those generated during radio-wave and infra-red data communications.

Various forms of media may be involved in carrying at least one sequence of at least one instruction to processor 304 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 300 can receive the data on the communication link and convert the data to a format that can be read by computer system 300. For instance, a receiver such as a radio frequency antenna or an infrared detector can receive the data carried in a wireless or optical signal and appropriate circuitry can provide the data to I/O subsystem 302 such as place the data on a bus. I/O subsystem 302 carries the data to memory 306, from which processor 304 retrieves and executes the instructions. The instructions received by memory 306 may optionally be stored on storage 310 either before or after execution by processor 304.

Computer system 300 also includes a communication interface 318 coupled to bus 302. Communication interface 318 provides a two-way data communication coupling to network link(s) 320 that are directly or indirectly connected to at least one communication networks, such as a network 322 or a public or private cloud on the Internet. For example, communication interface 318 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 322 broadly represents a local area network (LAN), wide-area network (WAN), campus network, internetwork or any combination thereof. Communication interface 318 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 318 sends and receives electrical, electromagnetic or optical signals over signal paths that carry digital data streams representing various types of information.

Network link 320 typically provides electrical, electromagnetic, or optical data communication directly or through at least one network to other data devices, using, for example, satellite, cellular, Wi-Fi, or BLUETOOTH technology. For example, network link 320 may provide a connection through a network 322 to a host computer 324.

Furthermore, network link 320 may provide a connection through network 322 or to other computing devices via internetworking devices and/or computers that are operated by an Internet Service Provider (ISP) 326. ISP 326 provides data communication services through a world-wide packet data communication network represented as internet 328. A server computer 330 may be coupled to internet 328. Server 330 broadly represents any computer, data center, virtual machine or virtual computing instance with or without a hypervisor, or computer executing a containerized program system such as DOCKER or KUBERNETES. Server 330 may represent an electronic digital service that is implemented using more than one computer or instance and that is accessed and used by transmitting web services requests, uniform resource locator (URL) strings with parameters in HTTP payloads, API calls, app services calls, or other service calls. Computer system 300 and server 330 may form elements of a distributed computing system that includes other computers, a processing cluster, server farm or other organization of computers that cooperate to perform tasks or execute applications or services. Server 330 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 330 may comprise a web application server that hosts a presentation layer, application layer and data storage layer such as a relational database system using structured query language (SQL) or no SQL, an object store, a graph database, a flat file system or other data storage.

Computer system 300 can send messages and receive data and instructions, including program code, through the network(s), network link 320 and communication interface 318. In the Internet example, a server 330 might transmit a requested code for an application program through Internet 328, ISP 326, local network 322 and communication interface 318. The received code may be executed by processor 304 as it is received, and/or stored in storage 310, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening several instances of the same program often means more than one process is being executed. Multitasking may be implemented to allow multiple processes to share processor 304. While each processor 304 or core of the processor executes a single task at a time, computer system 300 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A computer-implemented method comprising:
   determining one or more digital image data subsets of digital image data for a digital image, at least a first digital image data subset corresponding to a writing having a respective writing location within the digital image and at least a second digital image data subset having a null marker;

transforming the one or more digital image data subsets to create one or more digital document data subsets that are based on the digital image data in a respective digital image data subset of the digital image data subsets; and generating a digital document by:
adding the one or more digital document data subsets, including at least the first digital image data subset, to the digital document at a document location that is different than the respective writing location within the digital image; and excluding, from the digital document, all digital document data derived from a portion of the digital image that is marked using the null marker, including at least the second digital image data subset.

2. The computer implemented method of claim 1, further comprising receiving the digital image data by signaling a digital camera to capture the digital image data.

3. The computer implemented method of claim 1, further comprising determining the one of more digital image data subsets of the digital image data using a processor of an image analysis device that is communicatively coupled to a camera that captured the digital image data.

4. The computer implemented method of claim 1, wherein the respective writing location is represented using any of a region marker, a header marker, or a table marker.

5. The computer implemented method of claim 1, wherein at least one digital image data subset is associated with a particular writing location that is associated with an avatar marker associated with a user account.

6. The computer implemented method of claim 1, wherein at least one digital image data subset is associated with a particular writing location that is associated with a structure marker indicating a structural position of the digital document data in the digital document.

7. The computer implemented method of claim 1, further comprising transforming the digital image data into a table in the digital document, the table comprising a plurality of rows and columns.

8. The computer implemented method of claim 1, further comprising transforming the digital image data into a flow diagram in the digital document.

9. The computer implemented method of claim 1, further comprising receiving the digital image data by receiving existing digital image data from a digital memory.

10. One or more non-transient computer readable storage media comprising instructions which, when executed by a processor, cause the processor to:
determine one or more digital image data subsets of digital image data for a digital image, at least a first digital image data subset corresponding to a writing having a respective writing location within the digital image and at least a second digital image data subset having a null marker;

transform the one or more digital image data subsets to create one or more digital document data subsets that are based on the digital image data in a respective digital image data subset of the digital image data subsets; and generate a digital document by:
adding the one or more digital document data subsets, including at least the first digital image data subset, to the digital document at a document location that is different than the respective writing location within the digital image; and excluding, from the digital document, all digital document data derived from a portion of the digital image that is marked using the null marker, including at least the second digital image data subset.

11. The non-transient computer readable storage media of claim 10 further comprising instructions which, when executed by the processor cause the processor to signal a digital camera to capture the digital image data.

12. The non-transient computer readable storage media of claim 10 further comprising instructions which, when executed by the processor cause the processor to determine the one of more digital image data subsets of the digital image data using a processor of an image analysis device that is communicatively coupled to a camera that captured the digital image data.

13. The non-transient computer readable storage media of claim 10, wherein the respective writing location is associated with any of a region marker, a header marker, or a table marker.

14. The non-transient computer readable storage media of claim 10, wherein at least one digital image data subset is associated with a particular writing location that is associated with an avatar marker associated with a user account.

15. The non-transient computer readable storage media of claim 10, wherein at least one digital image data subset is associated with a particular writing location that is associated with a structure marker indicating a structural position of the digital document data in the digital document.

16. The non-transient computer readable storage media of claim 10 further comprising instructions which, when executed by the processor cause the processor to transform the digital image data into a table in the digital document, the table comprising a plurality of rows and columns.

17. The non-transient computer readable storage media of claim 10 further comprising instructions which, when executed by the processor cause the processor to transform the digital image data into a flow diagram in the digital document.

18. A system comprising:
a processor,
a communication interface, and
a non-transitory computer-readable storage medium storing sequences of instructions, which, when executed by the processor, cause the processor to:
determine one or more digital image data subsets of digital image data for a digital image, at least a first digital image data subset corresponding to a writing having a respective writing location within the digital image and at least a second digital image data subset having a null marker;

transform the one or more digital image data subsets to create one or more digital document data subsets that are based on the digital image data in a respective digital image data subset of the digital image data subsets; and generate a digital document by:
adding the one or more digital document data subsets, including at least the first digital image data subset, to the digital document at a document location that is different than the respective writing location within the digital image; and excluding, from the digital document, all digital document data derived from a portion of the digital image that is marked using the null marker, including at least the second digital image data subset.

\* \* \* \* \*